United States Patent [19]

Reinhardt et al.

[11] Patent Number: 4,578,605
[45] Date of Patent: Mar. 25, 1986

[54] ELECTRIC MOTOR WITH A SYSTEM FOR MONITORING SPEED

[75] Inventors: Wilhelm Reinhardt, Schrozberg/Gütbach; Ulrich Rüdele, Weissbach, both of Fed. Rep. of Germany

[73] Assignee: ebm Elektrobau Mulfingen GmbH & Co., Fed. Rep. of Germany

[21] Appl. No.: 543,935

[22] Filed: Oct. 20, 1983

[30] Foreign Application Priority Data

Nov. 8, 1982 [DE] Fed. Rep. of Germany ....... 3241152

[51] Int. Cl.⁴ .............................................. H02L 37/00
[52] U.S. Cl. ................. 310/67 R; 310/68 R; 318/254
[58] Field of Search .............. 310/68 R, 68 B, 268, 310/671; 318/254 A

[56] References Cited

U.S. PATENT DOCUMENTS

| | | | |
|---|---|---|---|
| 3,535,626 | 10/1970 | Uemura et al. | 318/254 A X |
| 3,681,669 | 8/1972 | Ayers | 318/254 A X |
| 3,742,267 | 6/1973 | Papst | 310/67 |
| 4,086,519 | 4/1978 | Persson | 310/68 B |
| 4,143,288 | 3/1979 | Sato | 310/68 X |
| 4,164,690 | 8/1979 | Müller et al. | 318/254 Z |
| 4,220,879 | 9/1980 | Hoshini et al. | 310/68 R |
| 4,311,933 | 1/1982 | Riggs et al. | 310/68 |
| 4,374,347 | 2/1983 | Müller | 318/254 X |

Primary Examiner—Donovan F. Duggan
Attorney, Agent, or Firm—Jones & Askew

[57] ABSTRACT

Electric motor with a system for speed monitoring, especially for ventilators, fans, blowers and compressors, where the speed is monitored with the help of a speed-proportional signal, consisting of a stator and a rotor which can rotate in the stator, where the system for speed monitoring consists of a permanent magnet (16) which is mounted in the front end (14) of the rotor (2) which faces the stator (3) and a detector (12) which can be triggered by the magnetic field of the permanent magnet and is located on a circle with its midpoint in the axis (4) of rotation of the rotor (2) and with a radius corresponding to the radius of the circular path of the permanent magnet (16).

9 Claims, 11 Drawing Figures

ELECTRIC MOTOR WITH A SYSTEM FOR MONITORING SPEED

The present invention concerns an electric motor with a system for speed monitoring, especially for ventilators, fans, blowers, compressors, etc., where the speed is monitored with the help of a signal that is proportional to the speed, consisting of a stator and a rotor that is mounted so it can rotate in the stator.

A problem frequently encountered in the industry is monitoring the operation of ventilators, fans, blowers and compressors so that suitable countermeasures can be taken immediately in the event of breakdown.

A breakdown of a fan can have serious consequences under some circumstances. For example, if a fan which is used to cool electric components is no longer capable of removing the power loss from equipment which is in the form of heat, this can result in considerable damage.

Most of the known types of equipment which have performed this function in the past were mechanical or electromechanical systems such as flow meters or pressure sensors or weather vane relays. These parts have to be mounted at an appropriate location in the air stream or on the wall of the fan or air duct, but installation of these parts was always extremely expensive.

Another known method of monitoring the speed of a d.c. motor is known from German Pat. No. 2,617,131, where pulsation is measured on an impedance element during operation and sent via an amplifier to a band pass filter. Its output is relayed to a trigger element which activates an alarm or cutout element downstream.

This system is limited, however, to speed monitoring for d.c. motors, especially d.c. motors with a small number of lamellae.

The present invention is based on the goal of improving an electric motor of the type described initially, so that speed monitoring by a simple inexpensive method is possible, regardless of the type of motor design.

This is achieved according to this invention by means of the fact that the system for speed monitoring consists of a permanent magnet mounted in the front end of the rotor facing the stator and a detector which can be operated by the magnetic field generated by the permanent magnet, and the detector is located on a circle whose midpoint lies on the axis of rotation of the rotor and its radius corresponds to the radius of the circular pathway of the permanent magnet. According to this invention, the speed monitoring system is thus completely separate from the remaining drive mechanism as well as the electronic drive and control systems, thus permitting monitoring which is inexpensive and especially reliable.

Other advantageous versions of this invention are described in the subclaims.

This invention will now be explained in greater detail with reference to the practical examples illustrated in the accompanying figures.

Figure 1:
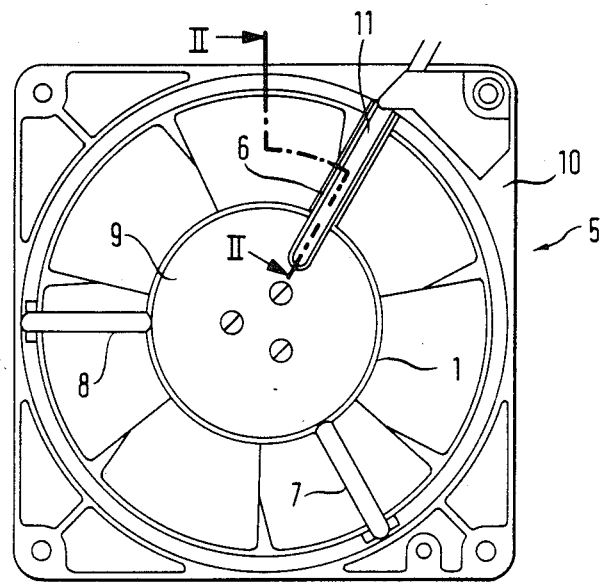
FIG. 1 shows a view of a compact fan with an electric motor according to this invention.
Figure 2:
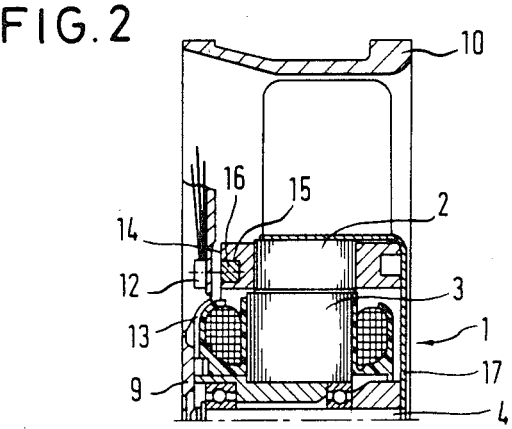
FIG. 2 shows a section along line II—II in FIG. 1.
Figure 4:
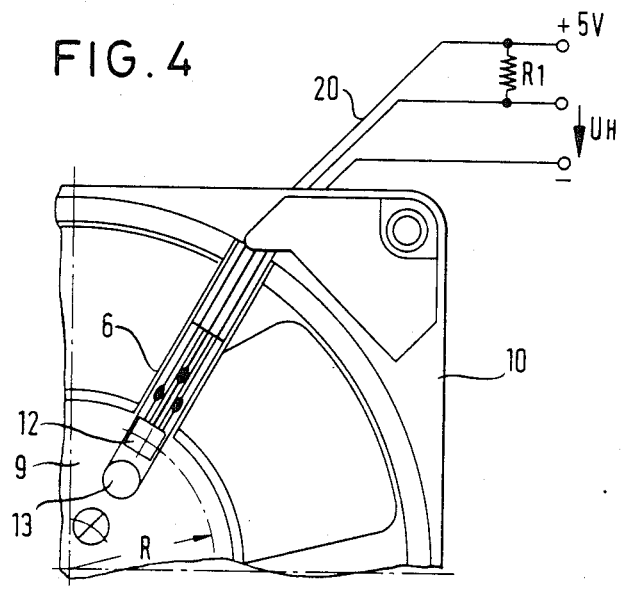
FIG. 4 shows a partial view from FIG. 1.

The motor (1) used according to this invention is preferably an external rotor type motor. This motor consists of a rotor (2) and a stator (3) mounted so that the rotor (2) can rotate in the stator (3) on a bearing axle (4), as shown in FIGS. 1 and 2. In FIG. 1, the motor (1) according to this invention is part of a compact fan (5). The motor (1) has struts (6, 7, 8) which connect the motor (1) with its flange (9) to a wall ring (10) and serve as a mount for the motor (1). One of the struts (6) in the practical example illustrated here has a U-shaped cross section, with the opening of the strut facing outward. This strut (6) holds a motor connection cable (11) as well as a detector (12) which is provided according to this invention as a speed detector (see especially FIGS. 2 and 4). This strut (6) thus serves as a cable channel which continues for about a centimeter at the transition to the motor flange (9). At the end of this cable channel there is an aperture (13) through which the connecting cable (11) is fed into the stator (3) of the motor (1).

Figure 3:
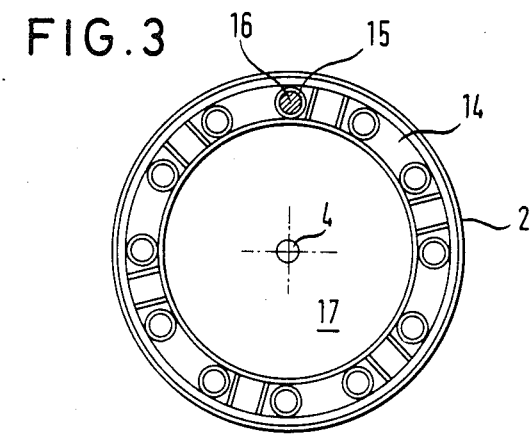
FIG. 3 shows a view of the front end of a rotor used in the motor according to this invention.

As FIG. 3 shows, a permanent magnet (16) is mounted in a hole (15) in the front end (14) of the pot-shaped rotor (2). The front end (14) is ring-shaped and is located at the end of the rotor cylinder which is closed at the other end by the rotor bottom (17) with the bearing axle (4) of the rotor mounted in the middle of it. The permanent magnet used according to this invention may be a magnet about 1 to 5 mm long with a cross-sectional area of about 4 to 28 mm$^2$ for the pole. The permanent magnet can be mounted in a separate hole in the front end (14) or in an aperture which is already available such as those for holding the weights used to equalize any imbalance in operation. Such apertures are provided in series in known types of rotors. The permanent magnet used according to this invention may be in the form of a rod magnet or a disk magnet, so it may have either a round or rectangular cross section.

An important feature of the present invention is that the detector provided according to this invention, which is triggered by the magnetic field of the permanent magnet, is mounted on the stator side in such way that it is located on a circle whose midpoint lies in the rotational axis (4) of the rotor and whose radius corresponds to the radius of the circular pathway of the permanent magnet. It is especially advantageous according to this invention for the detector to be a Hall-IC element, possibly a digital Hall-IC. Depending on which type of Hall-IC detector is used, the corresponding positioning of the permanent magnet in the hole in the rotor during assembly is such that either the north pole or the south pole is opposite the Hall-IC detector.

Figure 5:
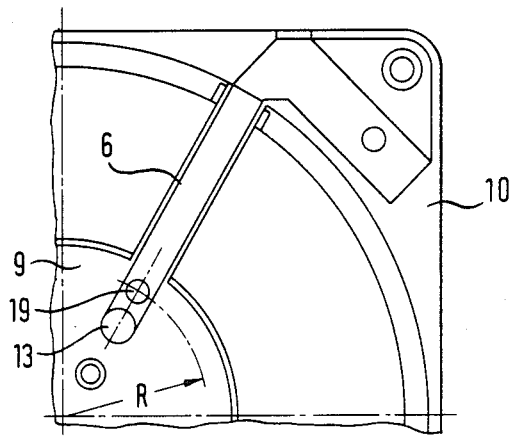
FIG. 5 shows a partial view according to FIG. 4 of one possible variation.

The positioning of the detector for speed monitoring in the sense according to this invention, with regard to the special structural features, depends on the design of the motor and the way in which the motor is used. In the practical example illustrated in FIG. 4, the motor according to this invention is installed in a compact fan (5) which yields the favorable possibility of mounting the detector (12) inside the channel-shaped struts (6) beneath the cable (11). Thus, the detector (12) is installed on the same arc (R) as the permanent magnet (16) which is mounted on the rotor side, and the detector is attached by suitable means such as gluing, etc. (see FIG. 4). If the strut (6) is made of a magnetic material, then the motor flange (9) in the area of the detector (12) should be provided with an aperture (19) (see FIG. 5) to permit magnetic flux from the rotating permanent magnet (16) on the detector (12).

Figure 6:
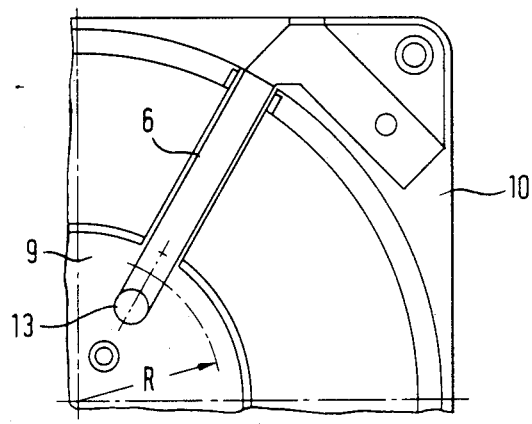
FIG. 6 shows a partial view according to FIG. 4 of another variation.

If the motor flange (9) is made of a nonmagnetic material such as plastic or aluminum, then no such aperture is necessary (see FIG. 6). In this case it may be expedient for the thickness of the material which forms the strut (6) which functions as a cable channel to be reduced at the location where the detector (12) is installed so that the switching operation of the detector is not impaired and there is a sufficient distance between the rotor (2) and the motor flange (9), preferably be between 0.5 and 2 mm.

Power is supplied to the detector (12) mounted on the strut (6) through a power line (20). A d.c. power supply of 5 volts is needed for a Hall-IC detector and may come either from the motor power supply or from an external power source (see FIG. 4).

When the detector (12) has been positioned and mounted, the connecting cable (11) can be laid in the channel-shaped strut (6) to provide extra security for the detector (12) in this way.

Figure 7:
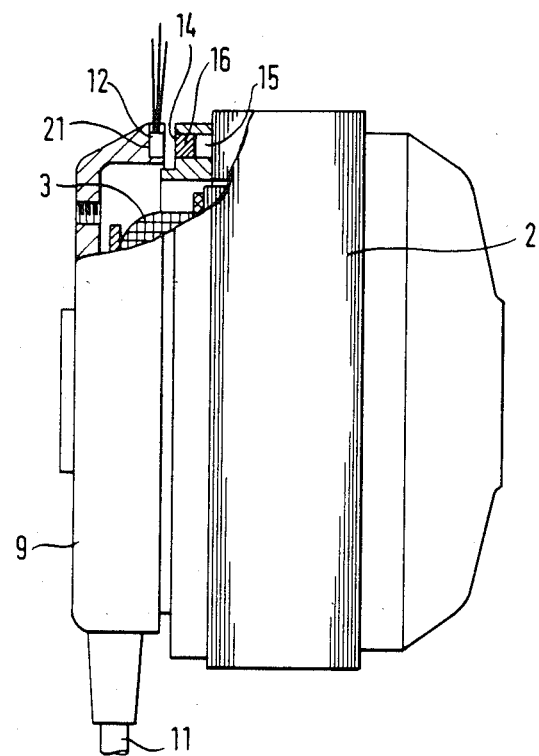
FIG. 7 shows a partial view through a radial fan with a motor according to this invention.

FIG. 7 shows another version of this invention where a motor according to this invention is used in a radial flow compressor or an axial flow compressor, where the motor flange (9) and the housing wall are connected directly to each other.

This results in the necessity of modifying the way in which the detector (12) is mounted in comparison with the example illustrated in FIGS. 1 to 6, but otherwise all parts are numbered as in the preceding figures. The motor flange (9) or stator flange here has a recess (21) designed to fit the shape and size of the detector (12). The detector (12) is again a Hall-IC detector in this example and is placed in this recess (21) and attached by a suitable means. The rotor-side mount of the permanent magnet (16) provided according to this invention is preferably in one of the apertures on the front that are normally used for balancing the rotor (2).

As an alternative way of mounting the detector (12), it is also possible to position the detector (12) by means of an additional mounting element, e.g., a specially shaped angle element (20) (see FIG. 8), in which case the detector (12) is mounted in this angle element, e.g., again in a recess. This angle element (20) may be mounted on a stator flange (9) or some other suitable location on the radial flow compressor so it is within the range of influence of the permanent magnet (16) on the rotor side.

Figure 8:
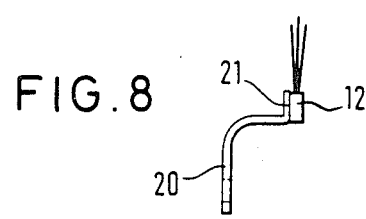
FIG. 8 shows a view of the angle elements according to this invention for mounting a detector.

The two possible types of mounting illustrated in FIGS. 7 and 8 are especially suitable when it is only the speed of the motor itself which is to be monitored, because these ways of mounting the detector are independent of the assembly of the motor at the point of use.

Figure 9:
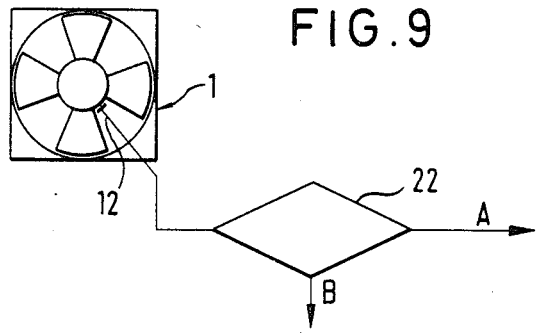
FIG. 9 shows an elementary circuit diagram of the speed monitoring system according to this invention.
Figure 10:
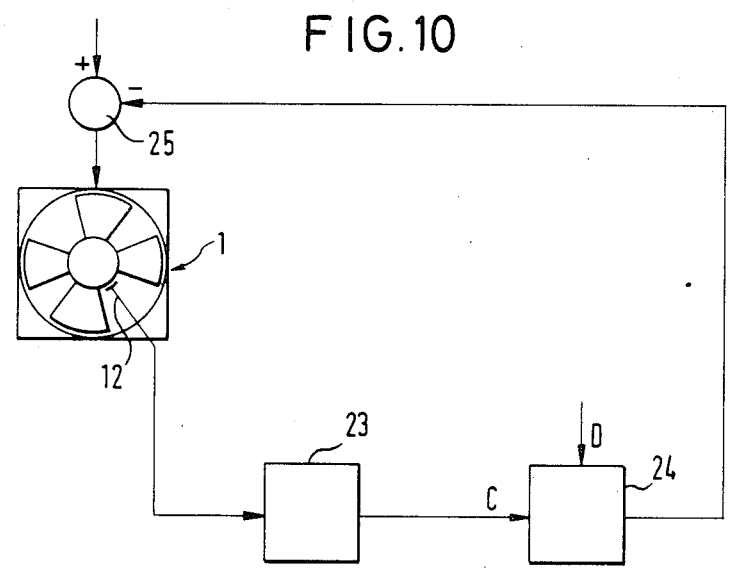
FIG. 10 shows a block wiring diagram of the speed monitoring system according to this invention.

The principle of operation of the motor according to this invention with regard to the speed monitoring system will be explained in greater detail with reference to FIGS. 9 to 11. As FIG. 9 shows, two different output signals can result from a breakdown of the motor (1), depending on the rotor position. If the motor (1) stops in a position such that the permanent magnet (16) comes to a standstill exactly in front of the detector (12), which is again a Hall-IC detector, then the output signal of the Hall-IC remains constantly at "0," but if it stops in the other position, the detector will remain constantly at "1." This continuous signal is detected by means of a subsequent electronic circuit (22) which does not belong to the scope of this invention. This signal triggers an alarm or cutoff element via output A. If there is no breakdown (output B) then operation is trouble-free. When using a Hall-IC with different circuit characteristics, some other potential assignment of output signals is of course also possible.

With the system according to this invention, the speed of the motor can be monitored. Since the time T per rotation of the motor depends on the rotational speed, the speed of the motor (1) can be determined by means of a speed detector device (23) which analyzes the output signal of the detector. A downstream speed regulator (24) compares the actual value (input C) with the ideal value (input D) on the basis of the given rotational time and causes an increase or reduction in speed by means of corresponding control units (25).

Figure 11:
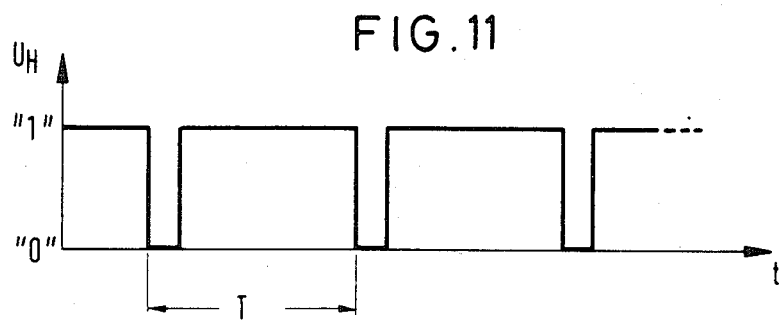
FIG. 11 shows the output voltage as a function of time for the detector used for speed monitoring according to this invention.

The output signals $U_H$ generated by the Hall-IC (12) are illustrated in FIG. 11. At the times when the output signal of the Hall-IC is zero, i.e., the logic signal "0" is transmitted, the permanent magnet is passing the Hall-IC. This provides information on the speed of the motor on the basis of the intervals between these "0" signals in accordance with the equation $T=1/\nu$ ($\nu$=rotational speed per second).

We claim:

1. Electric motor for a system for speed monitoring, especially for compressors, fans, ventilators and blowers, where the rotational speed is monitored with the help of a speed-proportional signal, the motor having a stator and a rotor which can rotate in the stator, wherein the system for speed monitoring comprises:
   a single permanent magnet mounted in the front end of the rotor facing the stator;
   said permanent magnet being rod or disk shaped with a rectangular or round cross section of about 4 mm² to 28 mm² and a length of about 1 mm to 5 mm; and
   a digital Hall-IC detector which is triggered by the magnetic field of the permanent magnet and which is located on the stator on a circle whose midpoint lies in the axis of rotation of the rotor and whose radius corresponds to the radius of the circular path of the permanent magnet, so that the nonrotating condition of the motor is indicated by either a continuous logic "0" or "1" output from the detector.

2. Electric motor for a system for speed monitoring, especially for compressors, fans, ventilators and blowers, where the rotational speed is monitored with the help of a speed-proportional signal, the motor having a stator and a rotor which can rotate in the stator, wherein the system for speed monitoring comprises:
   a single permanent magnet mounted in the front end of the rotor facing the stator;
   a digital Hall-IC detector which is triggered by the magnetic field of the permanent magnet and which is located on the stator on a circle whose midpoint lies in the axis of rotation of the rotor and whose radius corresponds to the radius of the circular path of the permanent magnet, so that the nonrotating condition of the motor is indicated by either a continuous logic "0" or "1" output from the detector; and the distance between the detector and the end surface of the permanent magnet being between 0.5 mm and 2 mm when they are facing each other.

3. Electric motor for a system for speed monitoring, especially for compressors, fans, ventilators and blowers, where the rotational speed is monitored with the help of a speed-proportional signal, the motor having a stator and a rotor which can rotate in the stator, wherein the system for speed monitoring comprises:
 a single permanent magnet mounted in an aperture in the front end of the rotor facing the stator; and
 a digital Hall-IC detector which is triggered by the magnetic field of the permanent magnet and which is located on the stator on a circle whose midpoint lies in the axis of rotation of the rotor and whose radius corresponds to the radius of the circular path of the permanent magnet, so that the nonrotating condition of the motor is indicated by either a continuous logic "0" or "1" output from the detector.

4. Electric motor for a system for speed monitoring, especially for compressors, fans, ventilators and blowers, where the rotational speed is monitored with the help of a speed-proportional signal, the motor having a stator and a rotor which can rotate in the stator, wherein the system for speed monitoring comprises:
 a single permanent magnet mounted in the front end of the rotor facing the stator;
 a digital Hall-IC detector which is triggered by the magnetic field of the permanent magnet and which is located on the stator on a circle whose midpoint lies in the axis of rotation of the rotor and whose radius corresponds to the radius of the circular path of the permanent magnet, so that the nonrotating condition of the motor is indicated by either a continuous logic "0" or "1" output from the detector;
 a motor flange on said stator; and
 a recess for the detector on the motor flange of the stator, said recess located on an arc with a radius corresponding to the distance between the permanent magnet, which is accommodated in a hole in the rotor, and the axis of rotation of the rotor.

5. Motor according to claim 4, characterized by the fact that the recess is provided in an angle element which is mounted on the side of the stator.

6. A compact ventilator with an electric motor where the rotational speed of the motor is monitored with the help of a speed-proportional signal, the motor having a stator and a rotor which can rotate in the stator, wherein the system for speed monitoring comprises a single permanent magnet mounted in the front end of the rotor facing the stator; and a digital Hall-IC detector which is triggered by the magnetic field of the permanent magnet and which is located on the stator on a circle whose midpoint lies in the axis of rotation of the rotor and whose radius corresponds to the radius of the circular path of the permanent magnet, so that the nonrotating condition of the motor is indicated by either a continuous logic "0" or "1" output from the detector, the ventilator comprising:
 a housing defining a wall ring;
 a plurality of struts mounted on said housing and extending radially inwardly of said wall ring;
 a motor flange connected to said struts and supported within said wall ring;
 said rotor being rotatably mounted within said wall ring with said permanent magnet facing said struts; and
 said detector being mounted in one of said struts in position to face the permanent magnet as the magnet is carried by said rotor.

7. Compact ventilator according to claim 6, further comprising a ventilator wheel, and wherein said one strut has a U-shaped cross section with an open side, and the open side of said one strut faces away from the ventilator wheel and away from the rotor, and inside the strut there is a connection cable connected to and radially leading away from the detector.

8. Compact ventilator according to claim 7, characterized by the fact that in an arc with a radius which corresponds to the rotor-side distance between the rotational axis of the ventilator wheel and the permanent magnet, the motor flange has a hole in an extension of the strut to conduct the magnetic flux of the permanent magnet to the detector.

9. Compact ventilator according to claim 7, characterized by the fact that on an arc with a radius corresponding to the rotor-side distance between the rotational axis and the permanent magnet, the thickness of the material from which the motor flange is made is reduced in an extension of the strut so as not to impair the operation of the detector in response to the permanent magnet.

* * * * *